Oct. 16, 1951   H. E. JACKSON   2,571,453
ELECTRIC SWITCH

Filed April 30, 1949   6 Sheets-Sheet 1

INVENTOR
H. E. JACKSON
by Wilkinson Mawhinney
Attys.

Oct. 16, 1951  H. E. JACKSON  2,571,453
ELECTRIC SWITCH
Filed April 30, 1949  6 Sheets-Sheet 2

INVENTOR
H.E. JACKSON
by Wilkinson Mawhinney
ATTYS

Oct. 16, 1951         H. E. JACKSON         2,571,453
ELECTRIC SWITCH

Filed April 30, 1949         6 Sheets-Sheet 3

INVENTOR
H. E. JACKSON

Oct. 16, 1951  H. E. JACKSON  2,571,453
ELECTRIC SWITCH

Filed April 30, 1949  6 Sheets-Sheet 4

INVENTOR
H. E. JACKSON

Oct. 16, 1951 H. E. JACKSON 2,571,453
ELECTRIC SWITCH
Filed April 30, 1949 6 Sheets-Sheet 5

INVENTOR
H. E. JACKSON
by Wilkinson Mawhinney
Attys.

INVENTOR
H. E. JACKSON

Patented Oct. 16, 1951

2,571,453

UNITED STATES PATENT OFFICE 2,571,453

ELECTRIC SWITCH

Harold Ernest Jackson, Great Barr, Birmingham, England, assignor to Cyril Kieft and Company Limited, Bridgend, Wales Application April 30, 1949, Serial No. 90,659
In Great Britain May 10, 1948

18 Claims. (Cl. 200—67)

This invention relates to electric switches.

An object of the invention is to provide a snap action electric switch which is economical to make and which is capable of being constructed in modified forms to serve a variety of duties while employing in each case a comparatively large proportion of identical component parts and occupying substantially the same space.

A further object of the invention is to provide an improved thermostatically operated snap action switch which is capable of effecting the rearrangement of the electrical connections of a number of heating elements under both manual and thermostatic control.

The invention is illustrated by way of example in the accompanying drawings in which Fig. 1 is a perspective view of a switch device showing tension and compression members mounted on a suitable base.

Figure 3:
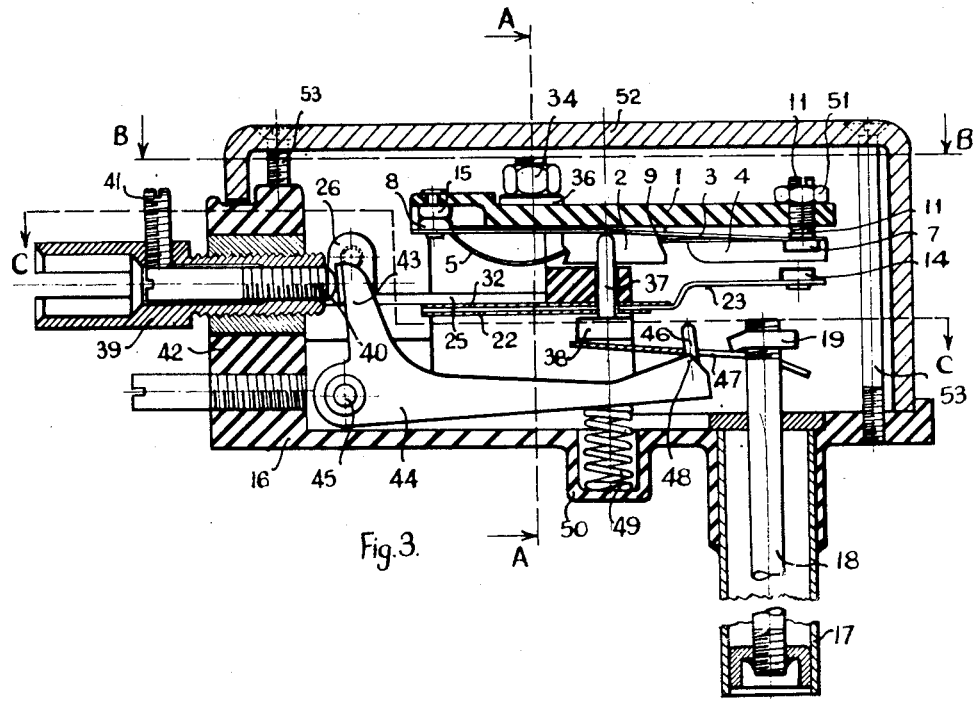
Fig. 3 is a sectional side elevation of a thermostatic switch embodying the construction shown in Fig. 1.
Figure 5:
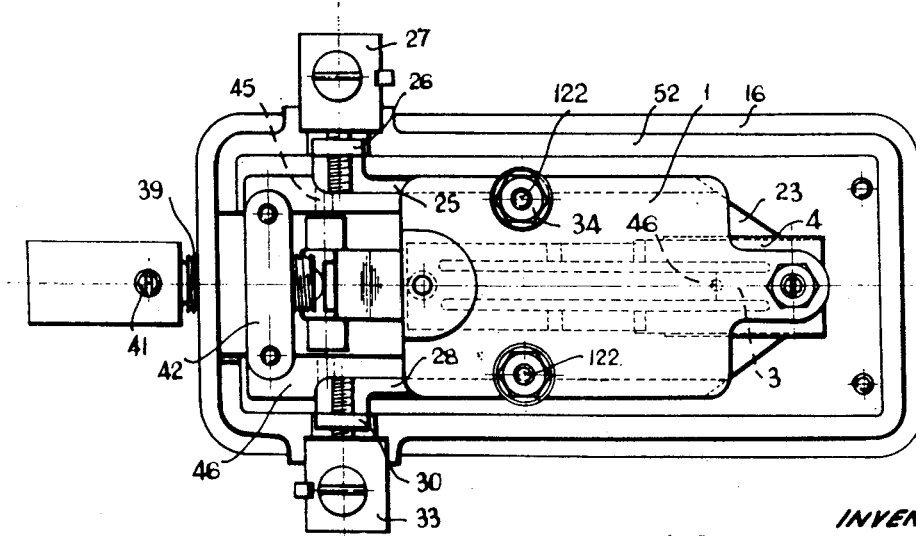
Fig. 5 is a sectional plan view on the line B—B Fig. 3.
Figure 11:
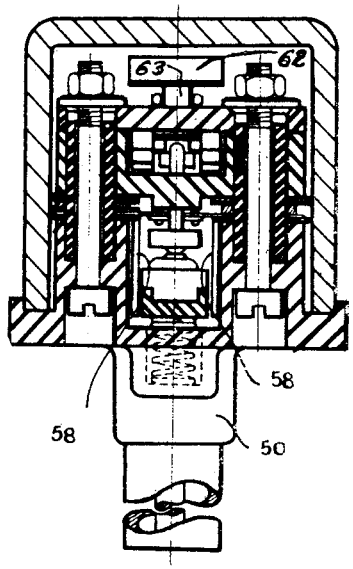
Figure 4:
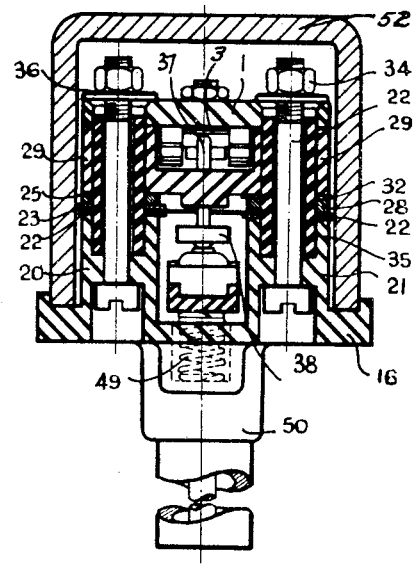
Fig. 4 is a sectional view on the line A—A of Fig. 3.
Figure 8:
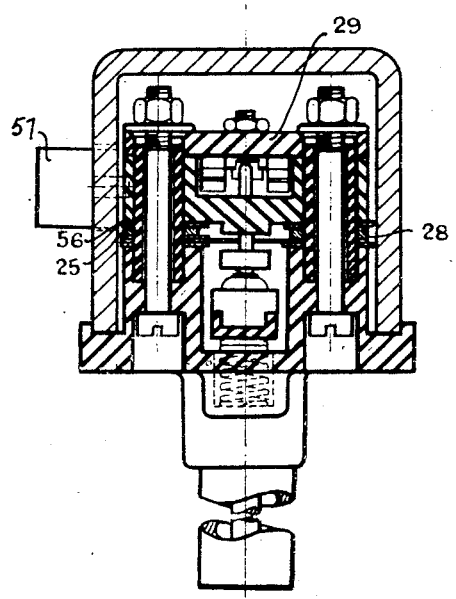
Figure 7:
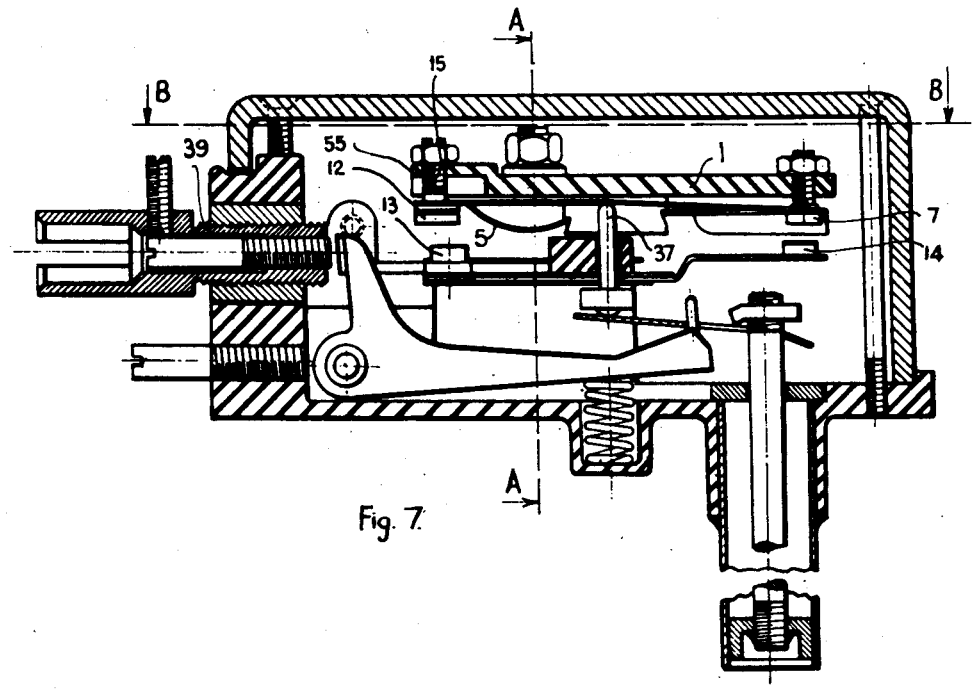
Figure 9:
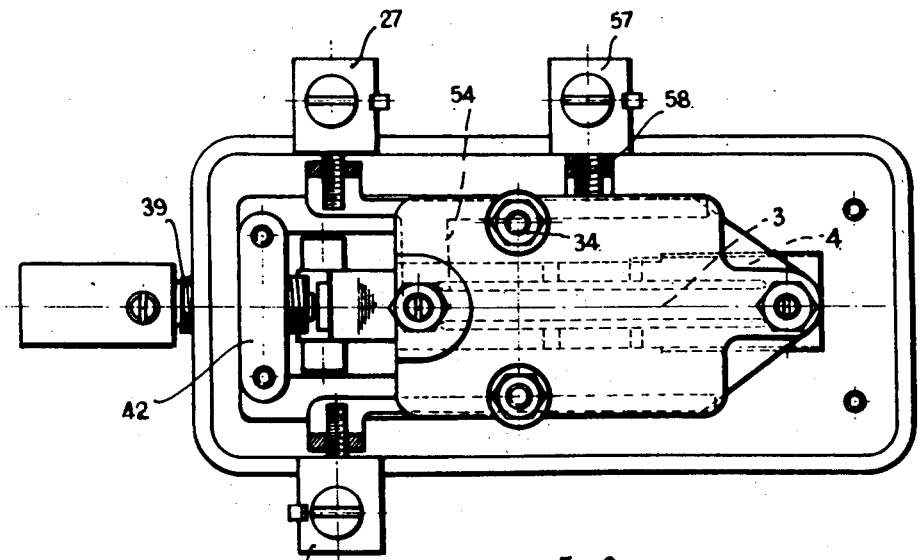
Figure 10:
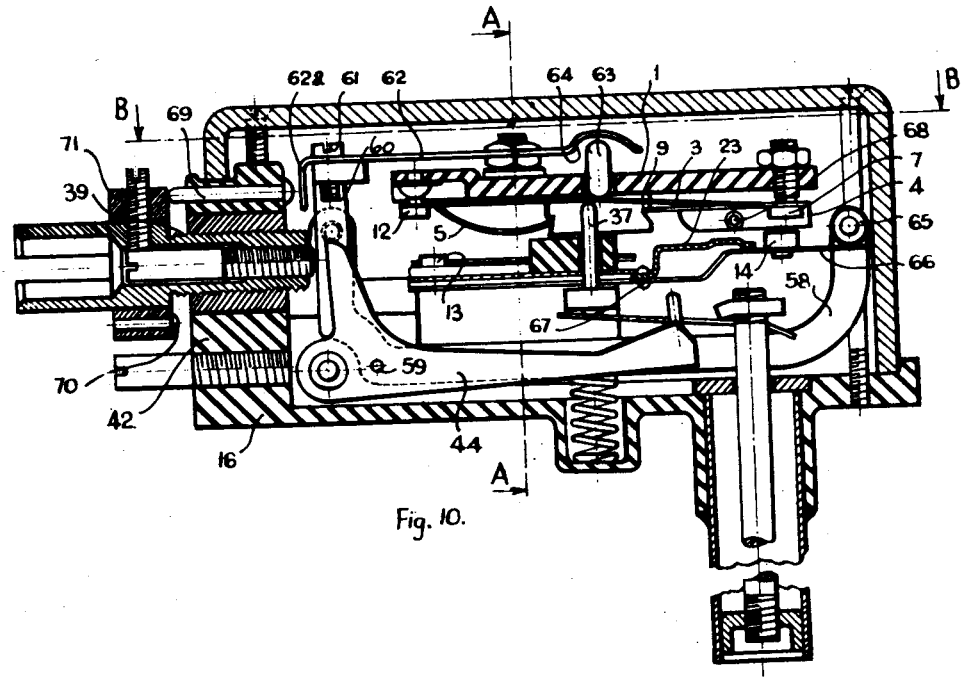
Figure 12:
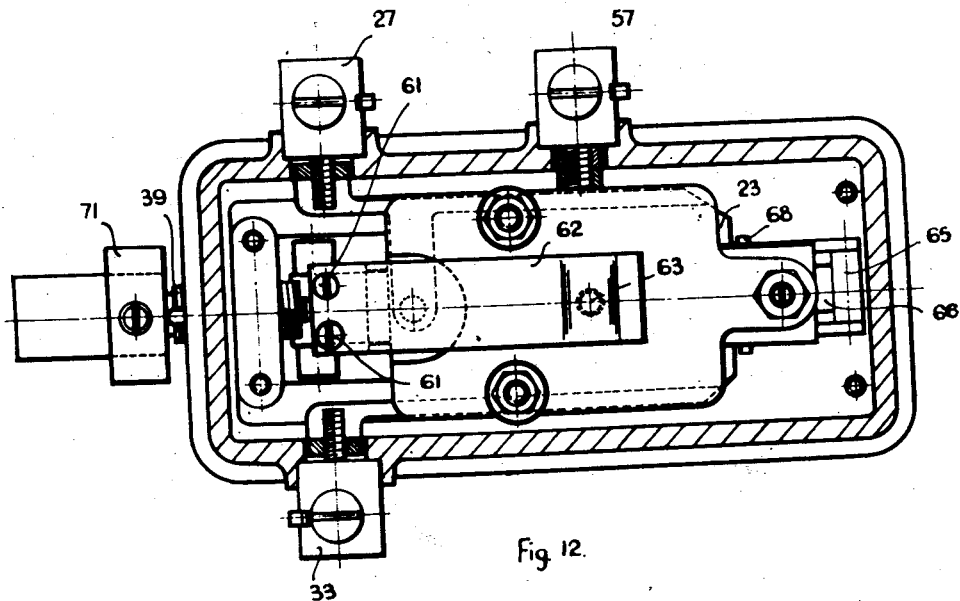

Figs. 7, 8 and 9 are views similar to Figs. 3, 4 and 5 of a modified construction and Figs. 10, 11 and 12 are views similar to Figs. 3, 4 and 5 of a further construction.

Figure 1:
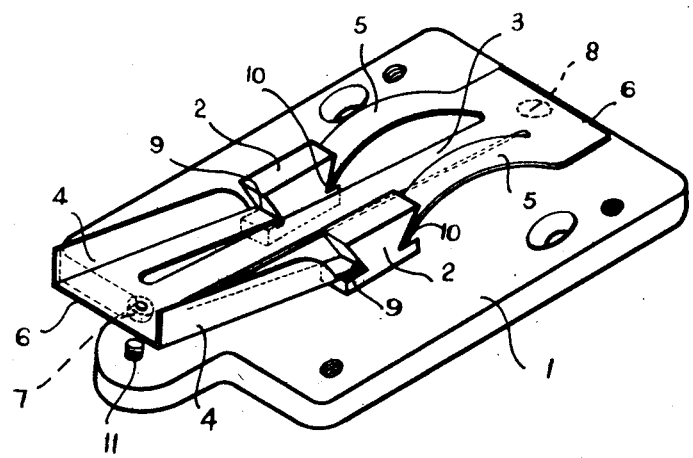
Figure 6:
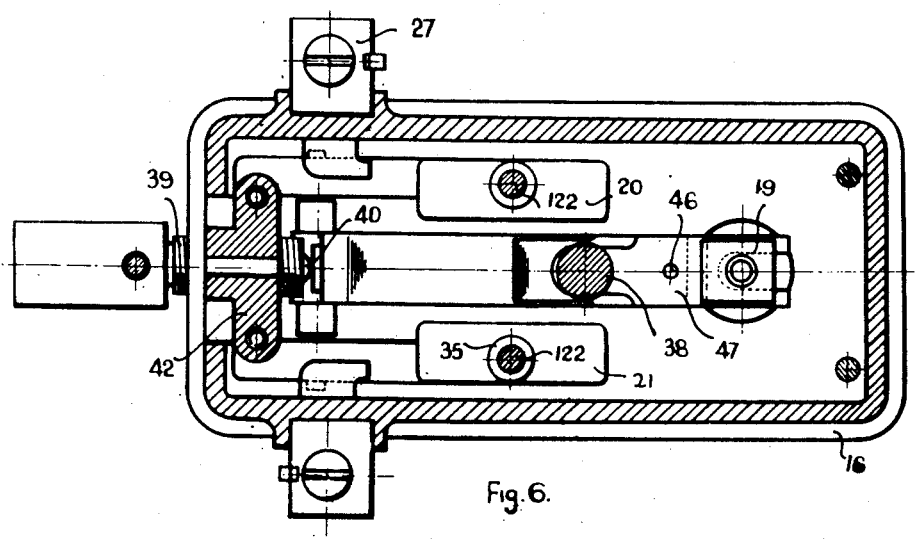
Fig. 6 is a sectional plan view on the line C—C of Fig. 3.

Referring to Fig. 1 of the accompanying drawings, a base 1 is provided at each side with a pillar 2. Within the two pillars 2 extends a resilient metal strip or operating member 3 which is integral with two pairs of arms 4, 4 and 5, 5 these arms extending from a transverse member 6 at each end of the strip 3. Electrical contacts 7 and 8 are disposed at opposite ends of the arrangement i. e. on the members 6. One of these contacts 8 may, as will be understood from the following description, be substituted by a stop or the contact may be such a stop.

The pillars 2 are provided on opposite faces with notches 9 and 10, the notches 9 being disposed nearer the base 1 than the notches 10. In Fig. 1 the portion of the strip 3 disposed between the pillars 2 is further from the base 1 than are the notches 9 and nearer the base than are the notches 10 and the strip 3 is shown in this disposition for greater clarity of illustration but without a stop, or electrical contact which is not shown, disposed above the end which carries the contact 7 the arms 4 would not remain in the position shown but would tend to move further in a clockwise direction about the notches 9 and the arms 5 would then tend to move in an anticlockwise direction about the notches 10.

The outer side portions of the arms 4 are bent at right angles to the arms as shown so that these arms are substantially inflexible or rigid while the arms 5 form bowed springs when mounted on the base. If a pressure is exerted on the intermediate portion of the strip 3 at a position between the end which carries the contact 7 and the notches 9, this end of the strip can be depressed so that the contact 7 engages a stop 11 on the base 1, while release of this pressure will result in the strip 3 moving to occupy the position shown in Fig. 1.

Figure 2A:
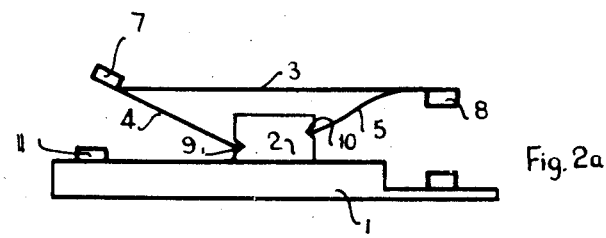
Figs. 2a, 2b, 2c, 2d, 2e and 2f are diagrammatic views illustrating the operation of the switch device of Fig. 1.
Figure 2B:
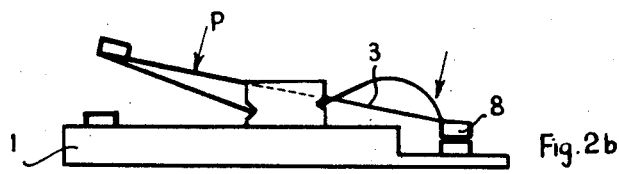
Figure 2C:
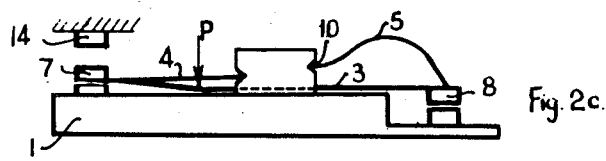
Figure 2D:
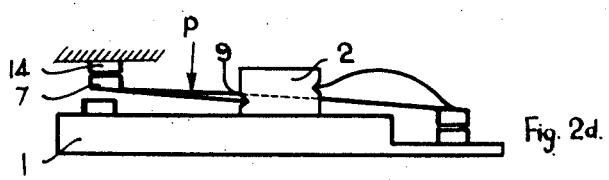

The behaviour of the device is explained with reference to Figs. 2a, 2b, 2c, 2d, 2e and 2f. Fig. 2a shows the parts in the initial process of assembly. The arms 4 and 5 are caused to engage the notches 9 and 10 respectively and the ends of the strip 3 are then pressed towards the base 1. Fig. 2b shows the end carrying the contact or stop 8 pressed first towards the base while the other end is being pressed down. In Fig. 2c the intermediate portion of the strip 3 extends between parallel planes containing respectively the notches 9, 9 and the base, being held in this position by a pressure P the planes referred to being at right angles to the plane in which the strip 3 moves. When the parts are as shown in Fig. 2c no pressure is required to hold the end of the strip 3 which carries the stop 8 towards the base and this end of the strip 3 remains against the base, even when the pressure P is reduced, until the intermediate portion of the strip 3 moves away from the base 1 past the notches 9. When the strip passes the notches 9 the end of the strip 3 which carries the contact 7 moves away from the base 1 and past a dead centre position in relation to the notches 9 so that the contact 7 snaps over and engages a fixed contact 14 as shown in Figure 2d. During this movement of the contact 7 the rigid arms 4 pivot about the notches 9.

Figure 2E:
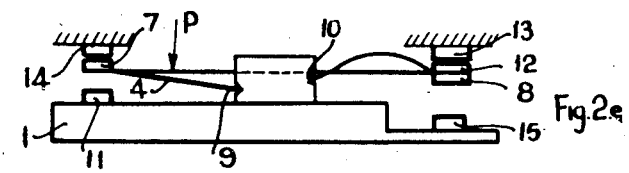

Further diminution of the pressure P permits the intermediate portion of the strip 3 to move above, as seen in Figs. 1 and 2a–2e, the plane containing the notches 10, 10 as shown in Fig. 2e whereupon the end of the strip 3 which carries the contact 8 moves away from a stop 15 fixed to the base until a contact or stop 12, seen in Fig.

2e engages a fixed contact 13. It will be appreciated that the planes containing the notches 9 and 10 and at right angles to the plane in which the strip 3 moves must be sufficiently near one another to enable this movement of the end of the strip 3 which carries the contacts or stops 8 and 12 to take place while the lengths of the arms 4 and 5 are suitably chosen so as to cause the strip 3 to have a sufficiently great movement when the pressure P is altered in the desired directions. As will be understood the bowing of the arms 5, which serve as springs in compression, place the arms 4 in compression and hold the strip 3 in tension.

Figure 2F:
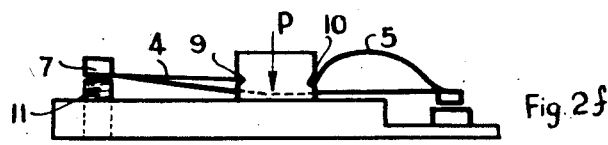

In the arrangement shown in Fig. 2f the notches 9 and 10 are equally spaced from the base 1. The stop 11 on the base against which the contact 7 is pressed is now raised from the base sufficiently to produce, when the pressure P is applied, a curvature in the strips 3 which brings the strip nearer to the notches 9 than to the plane of the notches 10. Consequently, when the pressure P is reduced the strip 3 moves past the notches 9, while remaining between the notches 10 and the base 1, and the strip end which carries the contact 7 then snaps over while the contact 8 remains stationary. It will be understood that adjustment of the height of the stop 15 instead of the stop 11 to bring the strip 3 nearer to the notches 10 than to the notches 9 will result in the contact 8 moving while the contact 7 remains against the stop 11.

It will further be appreciated that the strip 3 and arms 4 and 5 may be formed from an integral strip of resilient material and that, instead of having a single central strip 3 and arms 4 and 5 on opposite sides of the strip, two parallel side members may form the strip 3 while a single arm 4 and single arm 5 is disposed between and spaced from these parallel side members.

Adjustment of the position of the strip 3 in the arrangement shown in Fig. 1 in order that it should occupy the desired position in relation to the notches 9 and 10 may be effected by adjusting the stops carried in the base 1 as will be shown in the following description and later figures.

Instead of making the arms 4 and 5 integral with the strips 3 and end portions 6, some or all of these parts may be separate members secured together as will be appreciated.

Referring to Figs. 3, 4, 5, and 6, a body 16 is adapted to be attached, as by bolts or the like, to a switch panel of an electric cooking apparatus. Projecting outwards from the body 16 is a thermally responsive element of known kind which comprises a tube 17 which is rigidly fixed to the body 16 and is formed of a metal having a relatively high co-efficient of expansion. Within the tube 17 and fixed to the outer end thereof is a rod 18 having a relatively low co-efficient of expansion. The free end of the rod 18 is screw threaded and carries a nut 19. The element comprising the tube 17 and rod 18 is adapted to enter an oven chamber.

Integral with the body 16 are two pillars 20 and 21 which are each bored to receive bolts 122 which project from the pillars. The body 16 and pillars 20 and 21 are formed of electrically conducting material, for example an aluminium alloy, but may be made of an insulating material. Supported on the pillars 20 and 21 and insulated therefrom by insulating sheets 22, for example of mica, is a contact carrying member 23 of conducting material on which is mounted the contact 14. The pillar 20 also carries a further insulating sheet 24 on which is disposed a conductor bar 25. One end of this bar 25 is bent to form an upstanding lug 26 which is bored and screw threaded to receive the screw threaded shank of a terminal post 27. A similar conductor bar 28 having an upstanding lug 30 is carried on the pillar 21 and makes direct contact with the contact carrying member 23. Mounted on the pillars 20 and 21 is a bridge 29 formed of conducting material, suitably of the same metal as that of the body 16 and pillars 20 and 21.

The bridge 29 makes direct contact with the bar 25 but is insulated from the bar 28 by an insulating sheet 32. The lug 30 of the bar 28 is bored and screw threaded to receive the shank of a second terminal post 33. Disposed on the bridge 29 is the base 1 of the device shown in Fig. 1, the device in Figs. 3, 4, 5, and 6 being upside down as compared with its orientation in Fig. 1. The base 1 is also formed of electrically conducting material, for example aluminium alloy. The bolts 122 and nuts 34 secure the base 1, bridge 29, contact bars 25 and 28 and the contact carrying member 23 with the various insulating sheets described to the pillars 20 and 21. The bolts are insulated from the base 1, bridge 29, contact bars 25 and 28 and the member 23 by insulating sleeves 35, while the nuts 34 are insulated from the base 1 by insulating washers 36.

The contact 7 is adapted to be actuated to engage the contact 14 on the contact carrying member 23 so that, upon such engagement a circuit is made via terminal post 33, contact carrying member 23, contacts 14 and 7, rigid arms 4, pillars 2 and base 1, bridge 29 and contact bar 25 to terminal post 27. In this construction the body 16 is, of course, insulated from the support by which it is carried.

In order to move the contact 7 towards and from the contact 14 a pin 37 having a head 38 is slidably mounted in a bore in the bridge 29. The pin 37 with its head 38 are made of insulating material and the pin engages the strip 3 of the switch device to exert the pressure referred to with reference to Figs. 2b to 2e. This pressure is applied to the pin 37 by a manually operable adjusting screw 39 which is bored to receive a further screw 40 adjustable in the screw 39 and secured therein by a grub screw 41. The screw 39 is formed to receive a control knob, not shown, and is movable in a screw threaded bore in an end column 42 integral with the body 16. The projecting end of the screw 40 engages one arm 43 of an angular lever having a further arm 44. This lever is pivotally mounted on the body 16 by a pin 45 which is mounted in side walls 46 integral with the body 16.

The free end of the arm 44 of the angular lever carries, fixed to it, a pin 46 which enters a hole in a rocking lever 47, the arm 44 being formed with a knife edge 48 on which the lever 47 rocks, the pin 46 serving to locate the lever 47. One end of the rocking lever 47 engages the under surface of the head 38 of the pin 37 while the other end of the lever 47 is forked and embraces the upper end of the rod 18 below the nut 19.

The operation of the device shown in Figs. 3, 4, 5 and 6 is as follows: In the in-operated condition of the device the arm 44 of the angular lever is pushed to its uppermost position by a spring 49 which is housed in a pocket 50 in the body 16 and in this position of the angular lever the pin 37 presses the strip 3 towards the base 1 so that the intermediate portion of the strip lies between the base 1 and the notches in which the rigid arms 4 engage as in Figure 2c. The contacts 7 and 14 are thus open.

When the angular lever is moved in a clockwise direction about its pivot upon operation of the adjusting screw 39, the arm 44 of the angular lever moves down against the action of the spring 49 and releases the upward pressure upon the pin 37 so that the intermediate portion of the strip 3 is permitted to move away from the base 1 and past the notches in which the rigid arm 4 engage as in Figure 2d. Thereupon the end of the strip 3 which carries the contact 7 snaps over to engage the contact 14. Operation of the adjusting screw 39 to re-impose the pressure exerted by the pin 37 causes the contact 7 to snap over in the opposite direction and engage the stop 11. As shown the stop 11 is screw threaded into the base 1 and is secured in an adjusted position by a nut 51.

When the circuit of a heating element has been closed by closing the contacts 7 and 14 and the oven space has heated up sufficiently to cause the upper end of the rod 18 to move downwards, as viewed in Fig. 3, the rocking lever 47 rocks about the knife edge 48 in a clock-wise direction and moves the pin 37 upwards to open the contacts 7 and 14. When the oven cools sufficiently to permit the upper end of the rod 18 to return to its original position the rocking lever is moved anti-clockwise about the knife edge 48 and the contacts 7 and 14 are again closed. The temperature at which the rod 18 causes the contacts 7 and 14 to open depends on the position of the knife edge 48, which, of course, depends on the extent to which the adjusting screw 39 has been actuated to move the arm 44 of the angular lever in a clock-wise direction so that the temperature at which the oven is maintained is determined, as well as the manual switching on and off of the heating circuit effected, by actuation of a single control knob.

A cover 52 is held to the body 16 by bolts 53.

It will be noted that the end of the strip 3 other than that which carries the contact 7 remains stationary against a stop 15 during the operation of the switch but is not held in this position by means other than the stresses in the members 3, 4 and 5.

As has been described with reference to Fig. 2e, both ends of the strip 3 can be arranged to move in succession, the distance between the pairs of notches 9 and 10 and the relations between the lengths of the arms 4 and 5 and the strip 3 being suitably chosen. Such an arrangement is shown in Figs. 7, 8 and 9 in which the various parts are largely identical with those shown in Figs. 3, 4, 5 and 6. In the arrangement of Figs. 7, 8 and 9 however, the contact bar 25 has an inwardly directed arm 54 which carries contact 13. A fixed stop 15 is formed by a screw-threaded stud 55 which is adjustable for the purpose of setting the strip 3 to the correct position in relation to the pairs of notches 9 and 10 which, in this arrangement are equally spaced from the base 1 and the operation is as described with reference to Fig. 2f.

As shown more clearly in Fig. 8, the contact bar 25 is insulated from the bridge 29 by a sheet 56 of insulating material while an additional terminal post 57 has a screw-threaded shank 58 which screws into the bridge 29.

When the adjusting screw 39 is turned from the "off" position of the switch, the pin 37 is lowered and the intermediate portion of the strip 3 first passes below the notches 9. The end of the strip 3 which carries the contact 7 then moves from the stop 11 to engage the contact 14 on the contact carrying member 23. An electric circuit is then made from terminal post 33 via contact bar 28, contact carrying member 23, contact 14, contact 7 and bridge 29 to terminal post 57. Further actuation of adjusting screw 39 in the same direction causes pin 37 to drop still further under the force exerted by strip 3 until the intermediate portion of this strip passes the pair of notches 10 whereupon the end of the strip 3 which carries contact 12 moves from the stop 15 until contact 12 engages contact 13 on the arm 54 of the contact bar 25. An electric circuit is thus made from terminal post 27 via contact bar 25, arm 54, contact 12, contact 13 and bridge 29 to terminal post 57. If it be assumed that two resistance heating elements are each connected at one of their two ends to an electrical supply source and the other end of one element is connected to terminal post 33 while the other end of the other element is connected to terminal post 27, the switching operations just described will connect the two elements in parallel to the terminal post 57. This terminal post is earthed when one side of the supply source is earthed.

A suitably calibrated dial associated with the control knob, not shown, on the adjusting screw 39 indicates temperature settings of the knob and should the adjusting screw be turned beyond the point at which both pairs of contacts 7 and 14 and 12 and 13 are closed in order that the control knob be brought opposite a desired temperature graduation mark, operation of the thermostatic device 17 and 18 when the required oven temperature is reached will, as described above, move the pin 37 upwards to cause first contact 12 to move to the stop 15 and then cause contact 7 to move to the stop 11. By adjusting the contact carrying member 23 to bring the contact 14 nearer to the stop 11, the distance between contacts 7 and 14 when open being substantially less than that between contacts 12 and 13 when open, the time which elapses between the opening of contacts 12 and 13 and contacts 7 and 14 is reduced and may be very short. The manner in which the oven temperature is regulated under the control of the thermostatic device 17 and 18 is thus capable of some modification but in general it is usually desired to open the circuits of both heating elements as nearly together as possible. In the operations just described, the resilience of the strip 3, as will be understood, plays a part.

Should the actuating screw 39 be only moved sufficiently to close contacts 7 and 14, leaving contacts 12 and 13 open, the thermostatic device will, as will be understood, effect control only by opening contacts 7 and 14 at such times as the oven temperature exceeds the desired value.

The invention is also capable of being arranged to control the circuits of two heating elements, or circuits in such manner that actuation of a single manually operable member, for example the actuation screw 39, will cause one element to be energised, a further movement of the manually operable member in the same direction will cause a second element to be energised while causing the first element to be de-energised and a reverse movement of the manually operable member will cause the second element to be de-energised and the first element to be re-energised.

Such an arrangement is shown in Figs. 10, 11 and 12. In this arrangement the various parts are generally as arranged in Figs. 7, 8 and 9 with the contact bars 25 insulated from the bridge 29 and the contact carrying member 23 and connected to contact 13 while contact bar 28 is insulated from the bridge 29 and connected to the contact carrying member 23. Terminal posts 27, 33 and 57 are provided and arranged as described above.

In the construction as shown in Figs. 10, 11 and 12 the planes of the notches 9 and 10 are so spaced apart and the relative dimensions of the arms 4 and 5 and the strip 3 and the positions of the stops on the base 1, are such that the intermediate portion of the strip 3 will not, merely by release of the pressure exerted by the pin 37, move from the base 1 past the plane containing the notches 10 although it will so move past the plane of the notches 9. The end of the strip 3 which carries the contact 12 will not therefore move to cause the contact 12 to engage the contact 13 unless the strip 3 is moved by some auxiliary external force. This force is provided in the construction shown in Figs. 10, 11 and 12 by an auxiliary angular lever which comprises two spaced members 58 which are located on opposite sides of the angular lever 43, 44, this lever 58, 58 being pivotally mounted by pins 59 carried in bearings in the lever 44. This angular lever 58 has upright arms 60, 60 on which are fixed, by screws 61, a leaf spring 62 which extends from the arms 60 over the top of the switch as shown in Fig. 10. Slidably mounted in a bore in the base 1 is a pin 63 which rests on, and is normally held up by, the strip 3. The leaf spring 62 is formed as shown with a shoulder 64 which, when the auxiliary lever 58 is rocked in a clockwise direction as seen in Fig. 10 about its pivot, bears on the pin 63 and, forcing the pin downwards, moves the intermediate portion of the strip 3 past the plane containing the notches 10 whereupon the end of the strip which carries the contact 12 is moved to engage the contact 13. At the same time the contact 14 is moved downwards by engagement of a cross-bar 65 of insulating material, which is carried on the upturned free ends of the auxiliary lever 58, 58 so as to deflect a leaf spring 66 on which the contact 14 is mounted and which spring is itself fixed by a rivet 67 to the contact carrying member 23 which is stiff. The contact 7 is prevented from following the contact 14, and maintaining engagement with this contact, by a pin 68 of insulating material which is fixed to the flanges of the arms 4 and 5 and which abuts on the contact carrying member 23. Thus, when the actuating screw 39 is moved fully in the direction to supply current to the heating elements, the circuit of the first heating element already closed by the contacts 7 and 14 is opened while the circuit of the second heating element is closed by the contacts 12 and 13. When the actuating screw 39 is turned in the opposite direction the cross-bar 65 rises above the leaf spring 66 whereupon the contacts 7 and 14 again close the circuit of the first element so that, both pairs of contacts 7 and 14 and 12 and 13 being closed, both elements are in circuit.

While movement of the actuating screw 39 through substantially the whole of its operative movement was necessary to close the contacts 12 and 13, movement of the actuating screw in the reverse direction through a substantial arc, and to a position much nearer the "off" or inoperated position of the actuating screw than is the angular position of the screw at which the contacts 12 and 13 close, is necessary before the end of the strip 3 which carries the contact 12 moves to open the contacts 12 and 13. The contact 12 will, however, be moved to the stop 15 when the thermostatic device 17, 18, upon a sufficiently high rise in temperature of the oven, forces the pin 37 upwards to open the contacts 7 and 14 as well as the contacts 12 and 13. After such operation of the thermostatic device, and provided the actuating screw 39 has been moved back from its end position in which it causes the pin 63 to force the strip 3 downwards as described, contacts 7 and 14 only will close and open under the control of the thermostatic device.

The necessary movement of the auxiliary lever 58, 58 to cause the pin 63 to be moved downwards by the leaf spring 62 is effected by a plunger 69 which is slidably carried in a bore in the end wall 42 of the body 16. One end of this plunger is adapted to engage a bent-over end 62a of the leaf spring 62 when a projection 70 on a collar 71 on the actuating screw 39 abuts on the other end of the plunger and, as the screw 39 is turned, forces the auxiliary lever 58, 58 to rock about its pivot. The return movement in an anti-clockwise direction, as viewed in Fig. 11, of the lever 58, 58 is, after the screw 39 has been turned sufficiently far towards its "off" position to disengage the projection 70 effected by the leaf spring 66.

It will be appreciated that the arrangement shown in Figs. 10, 11 and 12 is suitable for use with an electric oven which is provided with a main heating element in the lower part of the oven and a grilling element in the upper part. It is required that either of these elements may be placed in circuit at a time and at certain other times that both are temporarily in circuit together. With the switch of Figs. 10, 11 and 12, the contacts 7 and 14 control the main element and the contacts 12 and 13 the grilling element. As described the main element or the grilling element may be switched on separately, while the oven can be heated rapidly by energising both elements at the same time and, upon a desired temperature being reached, thermostatic control is thereafter effected by opening and closing the circuit of the main element only.

The movements of the contact 7 may be very small, for example fifteen thousandths of an inch under the control of the pin 37 and that of the contact 12, in the arrangement of Figs. 7, 8 and 9 much greater, for example more than one sixteenth of an inch. In each case where the ends of the strip 3 move as a result of the tension in the strip, the movements in both directions of the contacts on these ends are snap movements.

The switch device shown in Fig. 1 may be mounted in a casing through which projects a pin such as the pin 37 and this casing may be movably, for example pivotally, mounted so that the end of the pin, or a head 38 thereon is engaged by a continuously rotating cam. By adjusting the position of the casing the pin may be engaged by the cam during the whole of a revolution of the latter so that the strip 3 is pressed to a position in which the contact 7 is held against the stop 11. By adjusting the position of the casing the pin may be engaged by the cam during only a part of a revolution thereof so that the contact 7 engages a contact 14 for periods dependent on the position to which the casing is adjusted. In this manner a heating element may be intermittently or continuously energised according to the adjustment of the casing so that the element may be held at a "boiling" or a "simmering" temperature or at different temperatures below the "boiling" temperature. The cam may advantageously be driven by known electric motors which give a very low speed of the driving spindle.

I claim:

1. A snap action switch device which comprises a resilient operating member having both its ends free to move, support means, rigid arms each connected at one end to said operating member and each having its free end pivoted on said support means with the free ends of the arms disposed at a common level, springs in compression each connected at one end to said operating member and having its free end pivoted on said support means with the free ends of the springs disposed at a common level, the said rigid arms and the said springs respectively extending in opposite directions towards one another from their positions of connection with the operating member with the pivoted ends of the rigid arms spaced from the pivoted ends of the springs and force applying means engaging the portion of the operating member intermediate the positions of connection of the rigid arms and the springs respectively with the operating member and arranged to apply a variable unidirectional force to move the said intermediate portion of the operating member into and from a position in which said intermediate portion extends between the pivoted ends of the rigid arm and the pivoted ends of the springs and to hold the intermediate portion in said position.

2. A snap action switch as claimed in claim 1 wherein the said levels are disposed in parallel spaced planes.

3. A snap action switch device which comprises a base, stops on said base, support means on said base, a resilient operating member having both its ends free to move, rigid arms each connected at one end to said operating member and each having its free end pivoted on said support means with the free ends of the rigid arms disposed in a common plane spaced from the base, resilient arms in compression each connected at one end to said operating member and having its free end pivoted on said support means with the free ends of the resilient arms disposed in a common plane spaced from the base, the said rigid arms and the said resilient arms respectively extending in opposite directions towards each other from their positions of connection with the operating member with the pivoted ends of the rigid arms spaced from the pivoted ends of the resilient arms, a stop spaced from and oppositely disposed in relation to one of said stops on the base, a plunger arranged to press on the portion of the operating member intermediate the positions of connection of the rigid arms and the resilient arms respectively with the operating member to stress the operating member and cause the intermediate portion of the operating member to extend between the said base and the pivoted ends of both the rigid arms and the resilient arms and thus hold the free ends of the operating member against said stops on the base, and means for displacing said plunger to reduce the pressure applied to said operating member and permit the said intermediate portion to move to and occupy a position in which the intermediate portion extends between the pivoted ends of the rigid arms and the pivoted ends of the resilient arms and thereby cause one of the free ends of the operating member to move to the said spaced oppositely disposed stop while the other free end of the operating member remains at rest.

4. A snap action switch device as claimed in claim 3 which comprises a pivotally mounted lever operatively connected with said plunger and a manually operable control member operatively connected with so as to move the lever.

5. A snap action switch device as claimed in claim 3 which comprises a manually operable pivotally mounted lever and a further lever pivotally mounted on the first mentioned lever, said further lever having one end operatively engaging the plunger, and the other end adapted to be engaged by a thermally responsive device.

6. A snap action switch device which comprises a base, stops on said base, fixed stops spaced from and oppositely disposed in relation to said stops on the base, a resilient operating member having both its ends free to move, rigid arms each connected at one end of said operating member and each having its free end pivoted on said support means with the free ends of the rigid arms disposed in a common plane spaced from the base, resilient arms in compression each connected at one end to said operating member and having its free end pivoted on said support means with the free ends of the resilient arms disposed in a common plane spaced from the base, the said rigid arms and the said resilient arms respectively extending in opposite directions towards each other from their positions of connection with the operating member with the pivoted ends of the rigid arms spaced from the pivoted ends of the resilient arms, a plunger arranged to press on the portion of the operating member intermediate the positions of connection of the rigid arms and the resilient arms respectively with the operating member to stress the operating member and cause the intermediate portion of the operating member to extend between the said base and the pivoted ends of both the rigid arms and the resilient arms and thus hold the free ends of the operating member against said stops on the base, and means for displacing said plunger to reduce the pressure applied to said operating member and permit the said intermediate portion to move to a position in which the said intermediate portion extends between the pivoted ends of the rigid arms and the pivoted ends of the resilient arms and thus cause one of the free ends of the operating member to move to one of said fixed stops, the said means for displacing the plunger being further arranged to move the plunger to a position in which the pivoted ends of both the rigid arms and the resilient arms are disposed between the said intermediate portion of the operating member and the base.

7. A snap action switch device as claimed in claim 6 which comprises a pivotally mounted lever operatively connected with said plunger and a manually operable control member operatively connected with so as to move the lever.

8. A snap action switch device as claimed in claim 6 which comprises a manually operable pivotally mounted lever and a further lever pivotally mounted in the first-mentioned lever, said further lever having one end operatively engaging the plunger and the other end adapted to be engaged by a thermally responsive device.

9. A snap action switch device which comprises a base, stops on said base, support means on said base, a resilient operating member having both its ends free to move, rigid arms each connected at one end to said operating member and each having its free end pivoted on said support means with the free ends of the rigid arms disposed in a plane spaced from the base, resilient arms in compression each connected at one end to said operating member and having its free end pivoted on said support means with the free ends of the resilient arms disposed in a plane spaced from the base, the said rigid arms and the said resilient arms respectively extending in opposite directions towards each other from their positions of connection with the operating member with the pivoted ends of the rigid arms spaced from the pivoted ends of the resilient arms, a plunger, an adjustable member, a lever fulcrumed on said adjustable member and bearing against said plunger and a control device operatively engaging said lever to pivotally move the lever on the said adjustable member, the said plunger pressing on the portion of the operating member intermediate the positions of connection of the rigid arms and the resilient arms respectively with the operating member to press the operating member towards the stops on the base and consequent on movement of the said lever to vary the pressure on the operating member to cause the intermediate portion of said member to move to a position in which the said intermediate portion extends between the pivoted ends of the rigid arms and the pivoted ends of the resilient arms and thereby cause one of the free ends of the operating member to move away from one of the stops on the base while the other end of the operating member remains at rest.

10. A snap action switch device which comprises a base, electrical contacts on said base, support means on said base, a resilient operating member having both its ends free to move, rigid arms each connected at one end to said operating member and each having its free end pivoted on said support means with the free ends of the rigid arms disposed in a plane spaced from the base, resilient arms in compression each connected at one end to said operating member and each having its free end pivoted on said support means with the free ends of the resilient arms disposed in a plane spaced from the base, the said rigid arms and the said resilient arms respectively extending in opposite directions towards each other from their positions of connection with the operating member with the pivoted ends of the rigid arms spaced from the pivoted ends of the resilient arms, a plunger movable to bear against the portion of the operating member intermediate the positions of connection of the rigid arms and the resilient arms respectively with the operating member and press the free ends of the operating member against the electrical contacts on the base, an adjustable member, manually operable means operatively connected with said adjustable member, a lever fulcrumed on said adjustable member and bearing against said plunger, a control means operatively engaging said lever to pivotally move the lever on the said adjustable member, the said plunger on movement by said lever being arranged to cause the intermediate portion of the operating lever to move into and rest in a position in which said portion extends between the pivoted ends of the rigid arms and the pivoted ends of the resilient arms and thereby cause one of the free ends of the operating member to move away from one of the electrical contacts on the base while the other end of the operating member remains at rest, a further plunger and means actuatable by said manually operable means to move said further plunger into engagement with the operating member and cause said other end of the operating member to move from the other of said electrical contacts on the base.

11. A snap action switch which comprises a base, electrical contacts on said base, electrical contacts spaced from and oppositely disposed with respect to the stops on the base, support means on said base, a resilient operating member having both its ends free to move, rigid arms each connected at one end to said operating member and each having its free end pivoted on said support means with the free ends disposed in a plane spaced from the base, resilient arms in compression each connected at one end to said operating member and each having its free end pivoted on said support means with the free ends of the resilient arms disposed in a plane spaced from the base, the said rigid arms and the said resilient arms respectively extending in opposite directions towards each other from their positions of connection with the operating member with the pivoted ends spaced from the pivoted ends of the resilient arms, a plunger movable to bear against the portion of the operating member intermediate the positions of connection of the rigid arms and the resilient arms respectively with the operating member and press the free ends of the operating member against the electrical contacts on the base, an adjustable member, manually operable means operatively connected with said adjustable member a lever fulcrumed on said adjustable member and bearing against said plunger, control means operatively engaging said lever to pivotally move the lever on the said adjustable member, the said plunger on movement by said lever being arranged to cause the intermediate portion of the operating lever to move into and rest in a position in which said portion extends between the pivoted ends of the rigid arms and the pivoted ends of the resilient arms and thereby cause one of the free ends of the operating member to move away from one of the electrical contacts on the base to one of said oppositely disposed contacts while the other end of the operating member remains at rest, a further plunger, means actuatable by said manually operable means to move said further plunger into engagement with the operating member and cause said other end of the operating member to move from the other of said electrical contacts on the base, and means movable by said manually operable means into operative engagement with the contact oppositely disposed with respect to the free end of the operating member first moved from the contact on the base to displace said last-mentioned oppositely disposed contact.

12. A snap action switch device which comprises a resilient operating member held in tension and having both its ends free to move, fixed stops on one side of the operating member, compression members which extend in opposite directions towards one another from their positions of connection with the operating member and which have their free ends pivoted at fixed spaced pivotal positions, force applying means engaging the portion of the operating member intermediate the positions of connection of the compression members with the operating member and arranged to force the said intermediate portion of the operating member from the side of the said fixed pivotal positions further from the said fixed stops to the side thereof nearer the said stops and thereby cause the ends of the operating member to abut against the stops and means for reducing the force applied by said force applying means and thereby permitting the said intermediate portion of the operating member to move past a dead center position in relation to the pivoted end of a compression member extending in one direction to cause one free end of the operating member to move from one of said stops while the other end of the said operating member remains against the other of said stops.

13. A snap action switch device as claimed in claim 12 wherein the compression member extending in one direction is rigid and the compression member extending in the opposite direction is resilient.

14. A snap action switch device which comprises a resilient operating member held in tension and having both its ends free to move, an electrical contact on an end of said operating member, a pair of stop members including at least one cooperating fixed contact positioned in spaced relation on opposite sides of said end of the operating member, a further fixed stop member on the same side of the operating member as one of said pair of stop members, compression members which extend in opposite directions towards one another from their positions of connection with the operating member and which have their free ends pivoted at fixed spaced pivotal positions, force applying means engaging the portion of the operating member intermediate the positions of connection of the compression members with the operating member and arranged to force the said intermediate portion of the operating member from the side of the said fixed pivotal positions further from the side on which two of the above-mentioned stops are positioned to the side thereof nearer the said two stops and thereby cause the ends of the operating member to abut against the stops and means for reducing the force applied by said force applying means and thereby permitting the said intermediate portion of the operating member to move past a dead center position in relation to the pivoted end of a compression member extending in one direction to cause the said contact carrying end of the operating member to move from one of the said pair of stops to the other stop of the pair while the other free end of the said operating member remains unmoved.

15. A snap action switch device as claimed in claim 14 which comprises a contact on each end of the operating member, a pair of stop members including at least one cooperating fixed contact positioned in spaced relation on opposite sides of each end of the operating member and means for progressively reducing the force applied by said force applying means to permit the said intermediate portion of the operating member to move in succession past dead center positions in relation to the pivoted ends of compression members extending in opposite directions and thereby cause the ends of the operating member to move in succession from stops on one side of the operating member to the stops on the opposite side thereof.

16. A snap action switch device as claimed in claim 14 wherein each compression member extending in one direction is rigid and each compression member extending in the opposite direction is resilient.

17. A snap action switch device which comprises an operating member held in tension and having both its ends free to move, fixed support means, a rigid arm connected at one end to said operating member and having its free end pivoted on said support means, a spring in compression connected at one end to said operating member and having its free end pivoted on said support means, the said rigid arm and said spring extending in opposite directions towards one another from their positions of connection with the operating member with their pivoted free ends spaced apart, and force applying means engaging the portion of the operating member intermediate the positions of connection of the rigid arm and the spring with the operating member and arranged to move the said intermediate portion of the operating member to opposite sides of either of said pivoted free ends and thus to cause an end of the operating member to move in opposite directions in succession while the other end of said operating member remains at rest.

18. A snap action switch device as claimed in claim 17 comprising means for actuating said force applying means to move the said intermediate portion of the operating member to opposite sides of both said pivoted free ends in succession and thus to cause both ends of the operating member to move in succession first in one direction and then in the opposite direction.

HAROLD ERNEST JACKSON.

REFERENCES CITED

The following references are of record in the file of this patent:

UNITED STATES PATENTS

| Number | Name | Date |
| --- | --- | --- |
| 2,129,151 | Raney | Sept. 6, 1938 |
| 2,370,479 | Meyer | Feb. 27, 1945 |
| 2,429,813 | Hausler | Oct. 28, 1947 |
| 2,486,033 | Kaminky | Oct. 25, 1949 |